United States Patent Office 2,904,555
Patented Sept. 15, 1959

2,904,555

GLUTARIC ACID COMPOUND

Rudolph Kodras, Skokie, Ill., assignor to International Minerals & Chemical Corporation, a corporation of New York No Drawing. Application August 21, 1958
Serial No. 756,281

8 Claims. (Cl. 260—339)

The present invention relates to the preparation of glutaric acid compounds. More particularly, it relates to the conversion of acrolein dimer into an alpha-substituted glutaric acid compound and optionally to the conversion thereof into glutamic acid.

It has now been discovered that 3,4-dihydro-1,2-pyran-2-carboxylic acid can be converted into alpha-hydroxyglutaric acid and/or the lactone thereof by a procedure which includes ozonization followed by cleavage and non-destructive oxidation. The glutaric acid compound or compounds obtained thereby can be converted readily into glutamic acid by reaction with ammonia and hydrolysis according to methods described in the art.

An object of the present invention is to prepare alpha-substituted glutaric acid compounds.

Another object is to prepare alpha-hydroxyglutaric acid and the lactone thereof.

Another object is to improve the conversion of acrolein dimer to alpha-hydroxyglutaric acid compounds.

Another object is to improve the conversion of acrolein dimer to glutamic acid.

Another object is to improve the conversion of 3,4-dihydro-1,2-pyran-2-carboxylic acid to alpha-hydroxyglutaric acid and to alpha-hydroxyglutaric acid lactone.

Other objects of the invention will be apparent from the present description.

Acrolein is readily converted into a dimer, 2-formyl-3,4-dihydro-1,2-pyran, by heating in the presence of a polymerization inhibitor, as described in U.S. Patent 2,562,848, Whetstone (July 31, 1951). The latter compound is readily converted into 3,4-dihydro-1,2-pyran-2-carboxylic acid by oxidation with silver oxide in an anhydrous, preferably mildly alkaline medium, or by reaction with an aluminum alcoholate (Whetstone, op. cit.).

In accordance with the present invention, the 3,4-dihydro-1,2-pyran-2-carboxylic acid is subjected to ozonization by passing an ozone-containing gas through a solution thereof in a suitable solvent. The 3,4-dihydro-1,2-pyran-2-carboxylic acid can be thus treated in the form of the free acid; or a metallic salt thereof, such as the sodium salt, potassium salt, or the like; or an ester thereof, preferably the methyl, ethyl, isopropyl, n-butyl, or other lower aliphatic ester having up to about 8 carbon atoms in the aliphatic radical; or the amide or an N-substituted amide having one or two lower alphatic substituent radicals as defined above. Any solvent can be used which dissolves the compound to be ozonized, which does not undergo substantial reaction during the ozonization treatment, and which does not adversely affect the course of the ozonization reaction. Suitable solvents include halogenated hydrocarbons such as methylene chloride, chloroform, carbon tetrachloride, and the like; lower aliphatic fatty acids, such as formic acid, acetic acid, propionic acid and the like; lower aliphatic monohydric alcohols such as methanol, ethanol, isopropyl alcohol, n-butyl alcohol, and the like; esters of such acids and alcohols, e.g., ethyl acetate, propyl acetate, ethyl propionate, and the like; naphthenic hydrocarbons such as cyclohexane, methylclohexane, cyclopentane, and the like; and other liquids readily ascertainable from the art. The concentration of the 3,4-dihydro-1,2-pyran-2-carboxylic acid compound in the solvent may vary widely from very low levels up to the saturation point. The ethyl ester, for example, can be satisfactorily ozonized in acetic acid at concentrations around 10 to 20% by weight or higher, based on the total solution; and the sodium salt can be satisfactorily ozonized in water at concentrations from about 4 to about 40% by weight.

The ozonization is conveniently carried out by passing through the solution a mixture of ozone and a diluent gas unaffected by the ozonization reaction, suitably air, oxygen, or an inert gas such as nitrogen. The concentration of ozone in the gaseous mixture is not critical, but the use of pure ozone or high concentrations of ozone may result in a waste of this material if the equipment or rate of flow does not permit adequate contact between the ozone and the solution undergoing treatment. It is ordinarily preferred to employ a stream of oxygen containing between about 2 and about 15% by volume of ozone. Lower concentrations of ozone are undesirable, because such concentrations unduly extend the reaction time.

The ozonization is most conveniently carried out at ordinary temperatures i.e., around 15 to 40° C., but higher temperatures and much lower temperatures can also be employed, suitably from as high as about 75° C. to as low as about −75° C.

The rate of addition of ozone to the solution of starting material is likewise not critical, and can be carried out at any convenient and reasonable rate under the existing conditions. At most rapid rates, the likelihood of losing ozone from the system because of incomplete reaction is increased, while at slow rates, the time required for complete ozonization is extended. In any event, the passage of ozone through the solution is continued until ozone appears in substantially increased proportions in the exit gases, thus indicating that the absorption thereof is materially decreased and that the ozone acceptor in the solution has been substantially completely reacted. The introduction of ozone is then discontinued.

The product of the ozonization reaction is presumably an "ozonide" or a mixture of "ozonides," at least initially, and is conveniently referred to as such. These intermediate materials have not been isolated or characterized, however, and their identity and structure cannot be said to be established. Whatever their nature, however, they are readily converted into alphahydroxyglutaric acid and/or the lactone of the latter by the procedure described herein.

The ozonization product mixture is subjected to treatment to cleave and preferably to oxidize the ozonide. The cleavage can be carried out simply by heating the ozonide in the presence of water at ordinary or somewhat elevated temperatures, e.g., from about 20 to about 100° C. This technique does not in general give maximum yields, owing to the presumable fact that the oxygen content of the ozonide is insufficient for complete conversion of the ozonide to the desired product. The cleavage is improved by the presence of an acidic substance, such as acetic acid, formic acid, sulfuric acid, hydrochloric acid, or the like. The conversion is further improved by subjecting the ozonide to oxidation, either at the same time or subsequently, employing a selective oxidation agent to effect non-destructive oxidation, at elevated temperatures up to the reflux point, suitably from about 50 to about 150° C. In a preferred technique, the ozonization product is added to water, then treated with air or oxygen until the solution becomes free from active oxygen (i.e., fails to liberate iodine from potassium iodide solution). For this purpose, a mixture of oxygen with a catalytic proportion of ozone (around 0.01 to 0.1%) is especially desirable. In another technique, the ozonization product is acidified (unless already acidic) with sulfuric acid, hydrochloric acid, formic acid, acetic acid, or the like, then admixed with water and hydrogen peroxide, and refluxed for about 1 to about 15 hours until free from active oxygen. The relative quantities of water, hydrogen peroxide, and ozonide solution can be varied widely. Other oxidation agents can also be employed, such as cupric oxide, hypochlorous acid, sodium hypochlorite, potassium permanganate, oxides of nitrogen, and the like.

The initial product of cleavage and oxidation is believed to be alpha-hydroxyglutaric acid, which tends to convert spontaneously to alpha-hydroxyglutaric acid lactone. The oxidation product can readily be treated by conventional methods to recover the alpha-hydroxyglutaric acid and/or alpha-hydroxyglutaric acid lactone therefrom. Alternatively, the oxidation product can be converted into ammonium pyrrolidonecarboxylate by reaction with ammonia at elevated temperatures. Prior to ammonia treatment, any volatile organic acids, such as formic acid or acetic acid, are removed by fractional distillation, azeotropic distillation, or other suitable means. Inorganic acids, such as sulfuric acid, are neutralized and/or removed, e.g., by precipitation with barium hydroxide or other suitable base. Any solids formed thereby are filtered off. The ammoniation can be carried out with either aqueous or anhydrous ammonia. The quantity of ammonia can be varied widely, but should preferably be at least sufficient to react fully with all of the intermediates capable of being converted into pyrrolidonecarboxylic acid. For this purpose, it is sufficient to use ammonia in a 2:1 molar ratio to the original 3,4-dihydro-1,2-pyran-2-carboxylic acid, and it is preferred to use a ratio of about 4:1 or higher, optimally about 6:1. The ammoniation is suitably carried out in a pressure vessel at a temperature between about 250 and about 350° C. for about ½ to about 30 hours, the time and temperature varying inversely.

The product of the ammoniation reaction is believed to be predominantly an ammonium salt of pyrrolidonecarboxylic acid, from which pyrrolidonecarboxylic acid can readily be recovered in a known manner. The crude ammoniation product can also be treated to produce DL-glutamic acid by hydrolysis under acid or basic conditions according to techniques well known in the art. After hydrolysis, the DL-glutamic acid can be recovered from the hydrolyzate by crystallization at its isoelectric point, around pH 3.2.

The following examples will more clearly illustrate the invention, having reference to certain specific aspects thereof.

To prepare 3,4-dihydro-1,2-pyran-2-carboxylic acid, acrolein dimer was catalytically oxidized with air in the presence of a catalyst comprising silver oxide supported on iron oxide. In a typical catalyst preparation, 26.5 grams of $Fe_2O_3$ powder and 0.8 gram of sodium hydroxide were commingled with 350 milliliters of distilled water in a 40-ml. beaker. After the sodium hydroxide had complete dissolved, a solution of 0.42 gram of silver nitrate in about 40 ml. of distilled water was added with stirring. The resulting suspension was allowed to settle, and the supernatant liquid was decanted. The solids were washed twice with 350-ml. portions of distilled water by decantation. The wet, washed solids were the desired catalyst.

The catalytic oxidation of acrolein dimer was carried out at room temperature, 25 to 30° C., according to the following procedure. Acrolein dimer was dispensed from a dropping funnel into an aqueous slurry of the catalyst in a 2-liter beaker equipped with a thermometer, a mechanical stirrer, two coarse gas dispersion tubes, a capillary tube extending nearly to the bottom of the beaker, and two electrodes for pH measurement. The electrodes were connected to a Beckman automatic titrimeter, which was set up to dispense an aqueous sodium hydroxide solution of approximately 20% concentration into the beaker at a point near one of the gas dispersion tubes. The pH of the reaction mixture was checked periodically with pH paper, and an effort was made to maintain the pH in the range of about 7 to 9. For this purpose, it was determined that an apparent pH setting of 11.2 to 11.6 was required on the automatic titrimeter owing to the fact that the electrodes became coated with iron oxide. Oxygen was metered from a cylinder into the gas dispersion tubes at the desired rate, generally around 100 liters per hour. After the addition of acrolein dimer had been completed, the oxidation was continued until no further change in pH took place (i.e., until the addition of sodium hydroxide solution by the automatic titrimeter ceased). The resulting mixture was filtered. The filtrate, comprising an aqueous solution of sodium 3,4-dihydro-1,2-pyran-2-carboxylate, was ordinarily distilled to some extent to remove any unreacted acrolein dimer and other volatile materials, and was then subjected to ozonization in the form of the sodium salt, or the free acid, or an ester of the acid.

The ozonization and subsequent oxidation are described more particularly in the individual examples.

After ozonization and oxidation, the product was commonly converted into DL-glutamic acid by neutralization with ammonia, evaporation to substantial dryness, reaction with an excess of ammonium hydroxide at 250° C. for 3 hours in a pressure vessel, removal of unreacted ammonia, and hydrolysis with hydrochloric acid under reflux conditions. The hydrolyzate was then analyzed for DL-glutamic acid as a measure of the overall conversion of the process.

Examples 1 through 6 are concerned with the ozonization of sodium 3,4-dihydro-1,2-pyran-2-carboxylate; Examples 7 and 8, the free 3,4-dihydro-1,2-pyran-2-carboxylic acid; and Examples 9 and 10, an ester of the said acid, viz., ethyl 3,4-dihydro-1,2-pyran-2-carboxylate.

The examples also illustrate the following aspects of the invention:

*Example 1.*—Ozonization of the sodium salt in aqueous solution. Oxidation in aqueous solution with hydrogen peroxide.

*Example 2.*—Ozonization in aqueous solution. Oxidation in aqueous 50% acetic acid with hydrogen peroxide.

*Example 3.*—Ozonization in aqueous solution. Oxidation in aqueous solution with oxygen containing a catalytic proportion of ozone.

*Example 4.*—Ozonization in aqueous solution. Oxidation in aqueous solution without acidification, using oxygen.

*Example 5.*—Ozonization in aqueous solution without cooling. Oxidation in aqueous solution with oxygen.

*Example 6.*—Ozonization in aqueous solution. Cleavage by refluxing the ozonide solution.

*Example 7.*—Ozonization of the free acid in aqueous solution. Oxidation in aqueous solution with oxygen containing a catalytic proportion of ozone.

*Example 8.*—Ozonization in glacial acetic acid. Oxidation in glacial acetic acid with oxygen containing a catalytic proportion of ozone.

*Example 9.*—Ozonization of the ethyl ester in glacial acetic acid. Oxidation in acetic acid with hydrogen peroxide.

*Example 10.*—Ozonization of the ethyl ester in glacial acetic acid. Oxidation in acetic acid with oxygen containing a catalytic proportion of ozone.

*Example 1*

Acrolein dimer (52 ml., 56 grams, 0.5 mole) which had been freshly distilled and stabilized with oxalic acid was oxidized according to the procedure and under the conditions described above, and the oxidation product, after being filtered, was evaporated to 500 ml.

A 50-ml. portion of the resulting concentrate, containing sodium 3,4-dihydro-1,2-pyran-2-carboxylate, was ozonized over a period of 80 minutes at 20–22° C. with a stream of oxygen containing between 3 and 4% of ozone. The ozonization product was acidified with 1.9 ml. of 95% sulfuric acid, commingled with 3.0 ml. of 50% hydrogen peroxide, and refluxed for 7.5 hours. The treated solution was neutralized with 4.5 ml. of concentrated ammonium hydroxide, evaporated to dryness, commingled with 60 ml. of concentrated ammonium hydroxide, heated in a pressure vessel at 250° C. for 3 hours, and hydrolyzed by refluxing with 90 ml. of 20% hydrochloric acid for 4 hours. The hydrochloric acid was removed from the hydrolyzate by distillation, and the residue was dissolved in water, analyzed for glutamic acid content, and found to contain 5.34 grams of DL-glutamic acid, corresponding to a 72.7% yield, based on acrolein dimer.

Example 2

Acrolein dimer (78 ml., 84 grams, 0.75 mole) was oxidized according to the procedure and under the conditions described above, the quantities of reactants and catalyst being otherwise the same. The filtered and clarified oxidation product (1740 ml.) was evaporated to 560 ml. and adjusted to pH 7.0 (from 9.0) with 0.1 ml. of 20% hydrochloric acid. Chromatographic analysis of the resulting solution with BuOH—AcOH—$H_2O$ (4:1:1, volume basis) gave a single spot in the known position for sodium 3,4-dihydro-1,2-pyran-2-carboxylate. The solution was then diluted to 750 ml. and reserved for ozonization tests.

A 100-ml. portion of the above solution was evaporated to 30 grams, transferred to a glass flask, and ozonized at 15–18° C. with 3–4% ozone in oxygen at a flow rate of about 30 liters per hour over a period of 94 minutes. The treated solution was commingled with 40 ml. of acetic acid, 1 ml. of 95% sulfuric acid, and 7 ml. of 50% hydrogen peroxide, then heated and stirred at 90° C. until a potassium iodide test for active oxygen was negative, about 5 hours being required for this purpose. Concentrated ammonium hydroxide solution (4 ml.) was added and the solution was evaporated to dryness. The residue was reacted with an excess of ammonium hydroxide at 250° C., hydrolyzed with hydrochloric acid, and analyzed for glutamic acid content. The yield of DL-glutamic acid was 8.64 grams, or 58.8% of theory based on the original acrolein dimer.

Example 3

Acrolein dimer (39 ml., 42 grams, 0.376 mole) was oxidized in 1665 ml. of water according to the procedure described above, the oxygen rate being 55–60 liters per hour, and the oxidation time being 3.33 hours. At the end of the oxidation, 71 ml. of aqueous 20% sodium hydroxide solution had been added. The completed reaction product was filtered, then refiltered through a layer of filter aid, and adjusted to pH 7 with hydrochloric acid. Chromatographic analysis gave a single spot in the known position for sodium 3,4-dihydro-1,2-pyran-2-carboxylate.

The oxidation product was evaporated to 375 ml., and a 50 ml. aliquot was ozonized to completion at 15° C. with 3–4% ozone in oxygen. The ozonization product was acidified with 1.83 ml. of 95% sulfuric acid, heated to 85–90° C., and treated with a stream of oxygen containing around 0.04% ozone for 7.5 hours, at the end of which time a potassium iodide test for active oxygen was negative. Chromatographic analysis of the resulting solution demonstrated the presence therein of alpha-hydroxyglutaric acid lactone. The solution was neutralized with ammonium hydroxide solution and evaporated to dryness. The residue was reacted with an excess of ammonia, hydrolyzed with hydrochloric acid, and analyzed for glutamic acid content. The product contained 2.56 grams of DL-glutamic acid, corresponding to a yield of 34.7%, based on acrolein dimer.

Example 4

Another 50-ml. portion of the oxidized acrolein dimer solution prepared and employed in Example 2 was ozonized directly (without evaporation to dryness) at 15° C. with 3–4% ozone in oxygen over a period of 57 minutes. The ozonized solution was oxidized at 90° C. with a stream of oxygen flowing at the rate of 30 liters per hour for 14 hours. The solution was then acidified with 1 ml. of 95% sulfuric acid and allowed to stand for 1.5 hours, after which it was neutralized with ammonium hydroxide and evaporated to near dryness. The residue was reacted with an excess of ammonia, hydrolyzed with hydrochloric acid, and analyzed for glutamic acid content. The product contained 1.814 grams of DL-glutamic acid, corresponding to a 24.7% yield, based on acrolein dimer.

Example 5

Another 50-ml. aliquot of the oxidized acrolein dimer solution prepared as described in Example 3 was ozonized without external cooling, employing a stream of oxygen containing 3 to 4% of ozone. The reaction was slightly exothermic, and the temperature rose from an initial level of 24° C. to an estimated maximum of about 40° C. After the ozonization had reached completion, the product liquid was acidified with 1 ml. of 95% sulfuric acid, heated to 90° C., and treated for 8 hours with a stream of oxygen flowing at the rate of 30 liters per hour. At the end of this time, a potassium iodide test for active oxygen was negative. The treated liquid was neutralized with 3 ml. of concentrated ammonium hydroxide and evaporated to dryness. The residue was reacted with an excess of ammonia, hydrolyzed with hydrochloric acid, and analyzed for glutamic acid content. The product contained 1.72 grams of DL-glutamic acid, corresponding to a 23.4% yield, based on acrolein dimer.

Example 6

Another 50-ml. aliquot of the oxidized acrolein dimer solution prepared as described in Example 3 was ozonized directly (without evaporation to dryness) at 15° C. with 3–4% ozone in oxygen. The resulting solution was refluxed for approximately 1.5 hours, at the end of which time a potassium iodide test for active oxygen was negative. The product obtained thereby, on being evaporated to dryness, ammoniated, and hydrolyzed, yielded 1.64 grams of DL-glutamic acid, corresponding to a 22.3% yield, based on acrolein dimer.

Example 7

A 50-ml. aliquot of the oxidized acrolein dimer solution prepared as described in Example 2 was adjusted to pH 1.8 with 13 ml. of aqueous 10% sulfuric acid. The resulting solution of free 3,4-dihydro-1,2-pyran-2-carboxylic acid was ozonized at 15° C. in 47 minutes with 3–4% ozone in oxygen. The ozonized solution was heated to 90° C. and treated for 5 hours with a stream of oxygen containing about 0.04% of ozone, flowing at the rate of about 30 liters per hour. At the end of this time, a potassium iodide test for active oxygen was negative. The product, on being neutralized with ammonia, evaporated to dryness, reacted with ammonia, and hydrolyzed, yielded 1.5 grams of DL-glutamic acid, corresponding to a yield of 20.4%, based on acrolein dimer.

Example 8

A 50-ml. portion of the oxidized acrolein dimer solution prepared and employed in Example 2 was evaporated to dryness. The resulting solid, weighing 7.5 grams, was dissolved in 50 ml. of glacial acetic acid and ozonized at 15–20° C. with 3–4% ozone in oxygen at a flow rate of about 30 liters per hour over a period of 56 minutes. The ozonized solution was acidified with 2 ml. of 95% sulfuric acid, heated to 90° C., and treated about 5 hours with a stream of oxygen containing around 0.04% of ozone at the rate of 30 liters per hour. The treated solution was commingled with 8 ml. of concentrated ammonium hydroxide solution and evaporated to dryness. The residue was reacted with an excess of ammonium hydroxide, hydrolyzed with hydrochloric acid, and analyzed for glutamic acid content. The yield of DL-glutamic acid was 2.98 grams, corresponding to 40.5% of theory, based on acrolein dimer.

*Example 9*

A solution of 7.8 g. (0.05 mole) of ethyl 3,4-dihydro-1,2-pyran-2-carboxylate in 50 ml. of glacial acetic acid was ozonized at 15° C. with 3–4% ozone in oxygen, 80 minutes being required. The ozonized product was commingled with 0.5 ml. of 95% sulfuric acid and 3.5 ml. of 50% hydrogen peroxide and heated to around 85–90° C. with stirring for a total of about 7 hours, at the end of which time a potassium iodide test for active oxygen was negative. The treated material, on being neutralized with ammonia, evaporated to dryness, ammoniated, and hydrolyzed, produced 5.77 grams of DL-glutamic acid, corresponding to a yield of 78.5%, based on the original ester.

*Example 10*

A solution of 7.8 grams (0.05 mole) of ethyl 3,4-dihydro-1,2-pyran-2-carboxylate in 50 ml. of glacial acetic acid was ozonized at 15° C. with 3–4% ozone in oxygen. After completion of the ozonization, 6 ml. of water and 0.5 ml. of 95% sulfuric acid were added, and the solution was treated at about 90° C. for about 5 hours with a stream of oxygen containing 0.04% of ozone, flowing at the rate of 30 liters per hour. At the end of this time, a potassium iodide test for active oxygen was negative. Chromatographic analysis demonstrated the presence of alpha-hydroxyglutaric acid lactone in the treated solution. The treated solution, on being neutralized with ammonium hydroxide, evaporated to dryness, ammoniated, and hydrolyzed, produced 4.468 grams of DL-glutamic acid, corresponding to a yield of 60.8%, based on the original ester.

While the foregoing description and examples refer to numerous details of starting materials, manipulative techniques, operating conditions, and associated matters, it is to be understood that such matters are illustrative only and that the invention is not limited thereto. To the contrary, numerous modifications and equivalents of the invention will be readily apparent from the foregoing description to those skilled in the art.

The following claims particularly point out and distinctly claim the subject matter of the invention.

I claim:

1. A process which comprises ozonizing a compound selected from the group consisting of 3,4-dihydro-1,2-pyran-2-carboxylic acid and the alkali metal salts and lower alkyl esters thereof, and subjecting the resulting ozonide to cleavage and non-destructive oxidation, whereby a product is obtained selected from the group consisting of alpha-hydroxygutaric acid and alpha-hydroxyglutaric acid lactone and mixtures thereof.

2. A process as in claim 1 for treating 3,4-dihydro-1,2-pyran-2-carboxylic acid.

3. A process as in claim 1 for treating a lower alkyl ester of 3,4-dihydro-1,2-pyran-2-carboxylic acid.

4. A process as in claim 1 for treating an alkali metal salt of 3,4-dihydro-1,2-pyran-2-carboxylic acid.

5. A process as in claim 1 wherein said non-destructive oxidation is carried out under acidic conditions.

6. A process which comprises subjecting an alkali metal salt of 3,4-dihydro-1,2-pyran-2-carboxylic acid to ozonization in aqueous solution, and subjecting the resulting ozonide to cleavage and non-destructive oxidation with oxygen containing a catalytic proportion of ozone, whereby a product is obtained selected from the group consisting of alpha-hydroxyglutaric acid and alpha-hydroxyglutaric acid lactone and mixtures thereof.

7. A process which comprises subjecting an alkali metal salt of 3,4-dihydro-1,2-pyran-2-carboxylic acid to ozonization in aqueous solution, and subjecting the resulting ozonide to cleavage and non-destructive oxidation with hydrogen peroxide, whereby a product is obtained selected from the group consisting of alpha-hydroxyglutaric acid and alpha-hydrogyglutaric acid lactone and mixtures thereof.

8. A process which comprises subjecting a compound selected from the group consisting of 3,4-dihydro-1,2-pyran-2-carboxylic acid and the alkali metal salts and lower alkyl esters thereof to reaction with ozone whereby an ozonization product is obtained.

References Cited in the file of this patent

UNITED STATES PATENTS

| | | |
|---|---|---|
| 2,752,375 | Acker | June 26, 1956 |
| 2,833,786 | Purvis | May 6, 1958 |

UNITED STATES PATENT OFFICE
CERTIFICATE OF CORRECTION

Patent No. 2,904,555            September 15, 1959

Rudolph Kodras

It is hereby certified that error appears in the printed specification of the above numbered patent requiring correction and that the said Letters Patent should read as corrected below.

Column 2, line 2, for "methylclohexane" read -- methylcyclohexane --; column 3, line 61, for "40-ml." read -- 400-ml. --; line 62, for "complete" read -- completely --.

Signed and sealed this 10th day of May 1960.

(SEAL)
Attest:

KARL H. AXLINE            ROBERT C. WATSON
Attesting Officer            Commissioner of Patents